Nov. 15, 1927.  
C. E. MAYNARD  
1,649,358  
METHOD OF BEVELING THE ENDS OF INNER TUBES  
Filed Dec. 30, 1926

INVENTOR.  
Charles Edgar Maynard  
BY Edward C. Taylor  
ATTORNEY.

Patented Nov. 15, 1927.

1,649,358

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF BEVELING THE ENDS OF INNER TUBES.

Application filed December 30, 1926. Serial No. 158,022.

This invention relates to the manufacture of inner tubes for automobile tires. It has particular reference to the production of a gradual, pointed, and accurate skive or taper upon the end of the tube without waste of material and by a method adaptable to the requirements of quantity production.

The invention will be described in connection with the accompanying drawings, in which—

In the manufacture of inner tubes it is necessary to skive or bevel the ends of the tube before it is spliced into annular form in order to avoid abrupt transitions in wall thickness. Tubes intended for well-base or drop-center balloon rims need very careful skiving in order to give the tube uniform expansibility. Generally this skiving has been done upon a special machine operating to trim and bevel the vulcanized tube after removal from the mandrel. Considerable success has also been had in the skiving of the tube while on the mandrel and during the vulcanizing process, appliances for this purpose having taken the form of metallic clamps or cuffs, rubber bands, or a wrapping of fabric.

Figure 10:
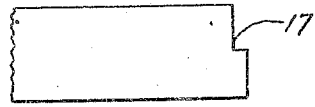
Fig. 10 is a detail of a special form of sheet stock used in one prior art method.

An example of the last-mentioned method is shown in Figs. 6 to 9. The tube 10, mounted on a mandrel 11, is cut at 12 to a definite length, a cross cut 13 enabling the waste end 14 to be removed for reworking. A helical wrapping 15 of fabric tape is now placed around the tube end, binding the latter tightly against the mandrel and causing a flow of the rubber. After removal of the wrapper, which generally is left on during vulcanization in order to seal the end of the tube against ingress of the vulcanizing fluid as well as to mold the rubber into the desired skive, the tube end has the appearance shown in Fig. 9. The skive thus produced is blunt as at 16, and gives neither gradual transition of thickness nor the even more desirable uniform expansibility. Attempts have been made to improve this skive by using a special sheet stock indicated in Fig. 10. The ends of this stock were stepped off as at 17, thereby producing a tube end having a single instead of a double thickness when the stock, as is customary, is rolled twice around the mandrel. Much difficulty is experienced, however, in the practice of this method, since it is hard to place the sheet with absolute accuracy on the mandrel, and since the nature of the cut on the end of the sheet is not adapted for production by machinery at high speed. Moreover, the method is not adaptable to tubes produced by the extrusion method.

Figure 1:
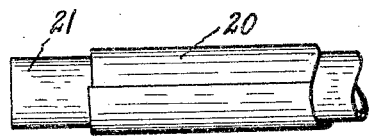
Fig. 1 is a detail of the end of a tube mounted upon a mandrel.
Figure 6:
Figs. 6, 7, 8 and 9 are views corresponding to Figs. 1, 2, 4 and 5 respectively but illustrating one method formerly practiced and the resulting tube end.
Figure 2:
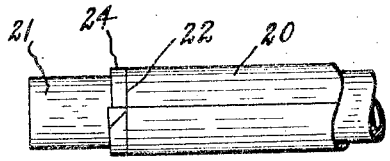
Fig. 2 is a similar view showing the trimming of the tube to length.
Figure 7:
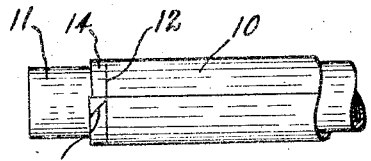
Figure 3:
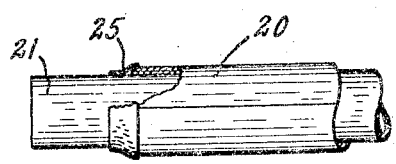
Fig. 3 is a similar view showing the application of a single ply end portion on the material.
Figure 8:
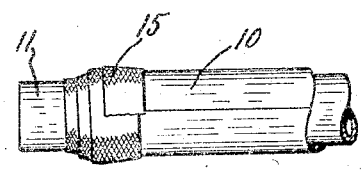
Figure 4:
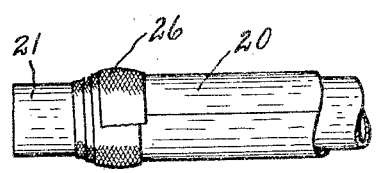
Fig. 4 is a similar view showing one manner of binding the tube end to the mandrel for vulcanization.
Figure 9:
Figure 5:
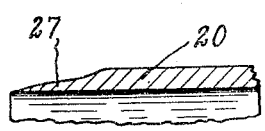
Fig. 5 is a detail of the vulcanized tube end.

I have devised a method which is adaptable to either the sheet or the extrusion method of producing tubes, and which avoids the objections to the methods outlined above. According to my method the rubber tube 20, mounted on the mandrel 21, is severed to length as at 22. The length of the tube may, however, be considerably less (say 1½ inches) than in the process described in connection with Figs. 6 to 9. The waste end 24 is removed as before, but before wrapping down the end of the tube a strip of rubber 25 of less than the thickness of the tube (conveniently about half of it) is wound around the tube end as in Fig. 3, its ends being either butt or lap jointed. After the wrapping 26 has been applied and the tube vulcanized, the end 27 takes on the appearance of Fig. 5, in which the much improved character of skive appears. The tube being trimmed accurately to length on the mandrel preserves this accuracy after vulcanization, and presents an end portion of improved uniformity, sharpness, and smoothness of bevel as compared with any prior process.

Having thus described my invention, I claim:

1. A method of producing a skived end on a rubber tube which comprises mounting the tube upon a mandrel, trimming the end of the tube to a predetermined length, applying a strip of rubber, of less gauge than the body of the tube, to the tube end so that it lies partly upon the tube and partly upon the mandrel, compressing the end of the tube against the mandrel, and vulcanizing the tube.

2. A method of producing a skived end on a rubber tube which comprises mounting the tube upon a mandrel, applying a strip of rubber, of less gauge than the body of the tube, to the tube end so that it is joined to the tube and lies partly upon the mandrel, compressing the end of the tube against the mandrel, and vulcanizing the tube.

CHARLES EDGAR MAYNARD.